US011378876B2

(12) United States Patent
Guo et al.

(10) Patent No.: US 11,378,876 B2
(45) Date of Patent: Jul. 5, 2022

(54) LIGHT SOURCE DEVICE AND DISPLAY APPARATUS

(71) Applicant: APPOTRONICS CORPORATION LIMITED, Guangdong (CN)

(72) Inventors: Zuqiang Guo, Guangdong (CN); Ning Lu, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 0 days.

(21) Appl. No.: 17/273,250

(22) PCT Filed: Mar. 1, 2019

(86) PCT No.: PCT/CN2019/076621
§ 371 (c)(1),
(2) Date: Mar. 3, 2021

(87) PCT Pub. No.: WO2020/048100
PCT Pub. Date: Mar. 12, 2020

(65) Prior Publication Data
US 2021/0325769 A1 Oct. 21, 2021

(30) Foreign Application Priority Data
Sep. 3, 2018 (CN) .......................... 201811020062.3

(51) Int. Cl.
*G03B 21/20* (2006.01)
*G02B 26/00* (2006.01)
(Continued)

(52) U.S. Cl.
CPC ......... *G03B 21/204* (2013.01); *G02B 26/008* (2013.01); *G02B 27/283* (2013.01);
(Continued)

(58) Field of Classification Search
CPC .............. G03B 21/204; G03B 21/2013; G03B 21/2066; G03B 21/2073; G03B 33/12;
(Continued)

(56) References Cited

U.S. PATENT DOCUMENTS

2013/0088471 A1 4/2013 Kitano
2013/0258639 A1* 10/2013 Hu ....................... G02B 26/008
362/84
(Continued)

FOREIGN PATENT DOCUMENTS

CN 102854728 A 1/2013
CN 105204279 A 12/2015
(Continued)

OTHER PUBLICATIONS

Chinese Office Action issued in application No. 201811020062.3 dated Jan. 29, 2021.
(Continued)

*Primary Examiner* — Jerry L Brooks
(74) *Attorney, Agent, or Firm* — Knobbe, Martens, Olson & Bear LLP

(57) ABSTRACT

A light source device, including: an excitation light source; a supplementary light source; and a color wheel, the excitation light source emits first color light to the color wheel, the color wheel includes a first light-emitting region and a wavelength conversion region sequentially arranged along circumferential direction, and a supplementary light-emitting region located on inner or outer side of the wavelength conversion region, the first light-emitting region receives the first color light in a first time period and emit it, the wavelength conversion region receives the first color light in a second time period and emit excited light, and the supplementary light source emits, during the second time period, a supplementary light that broadens a color gamut and at least
(Continued)

partially overlaps with a spectrum of the excited light, and the supplementary light from the supplementary light-emitting region is combined with the excited light from the wavelength conversion region.

20 Claims, 9 Drawing Sheets

(51) Int. Cl.
G02B 27/28 (2006.01)
G03B 33/12 (2006.01)
H04N 9/31 (2006.01)

(52) U.S. Cl.
CPC ..... *G03B 21/2013* (2013.01); *G03B 21/2066* (2013.01); *G03B 21/2073* (2013.01); *G03B 33/12* (2013.01); *H04N 9/3161* (2013.01); *H04N 9/3164* (2013.01)

(58) Field of Classification Search
CPC .. G02B 26/008; G02B 27/283; H04N 9/3161; H04N 9/3164
USPC ............................................................ 353/31
See application file for complete search history.

(56) References Cited

U.S. PATENT DOCUMENTS

| | | |
|---|---|---|
| 2014/0204558 A1 | 7/2014 | Bartlett |
| 2014/0253882 A1 | 9/2014 | King et al. |
| 2015/0062908 A1 | 3/2015 | Choi et al. |
| 2015/0124429 A1 | 5/2015 | Hoehmann |
| 2015/0177599 A1 | 6/2015 | Huang |
| 2016/0291315 A1 | 10/2016 | Hsu |
| 2017/0269462 A1* | 9/2017 | Maeda ............... G03B 33/08 |

FOREIGN PATENT DOCUMENTS

| | | |
|---|---|---|
| CN | 105652572 A | 6/2016 |
| CN | 106353959 A | 1/2017 |
| CN | 106444248 A | 2/2017 |
| CN | 108279548 A | 7/2018 |
| WO | WO 2017/121233 A1 | 7/2017 |

OTHER PUBLICATIONS

International Search Report issued in application No. PCT/CN2019/076621 dated May 29, 2019.
Extended European Search Report in Application No. 19857921.1, dated Oct. 7, 2021.

* cited by examiner

LIGHT SOURCE DEVICE AND DISPLAY APPARATUS

TECHNICAL FIELD

The present disclosure relates to the field of display technologies, and, in particular, to a light source device and a display apparatus.

BACKGROUND

With continuous development of projection display technology, people have higher requirements on parameters of a projection apparatus. High brightness, HDR (High-Dynamic Range), high resolution (such as 4K) and large color gamut range (DCI, Rec. 2020) have become a developing trend in the market. Compared with bulb light source, LED light source and pure laser light source, the projection apparatus adopting a laser fluorescent light source has the advantages of long service life, high brightness, and high cost performance, respectively, and is an ideal choice for the light source for current projectors. However, due to a wide wavelength range of the spectrum of fluorescent light generated by laser light, there are more limitations in expanding the color gamut compared to pure laser light sources.

At present, for the laser fluorescent light source, a commonly adopted method for achieving the Rec.709 or DCI color gamut standard is to incorporate electronic correction and add a filter in an optical path. As shown in FIG. 1, a blue laser light is used as an excitation light in the laser fluorescent light source. The excitation light incident on a color wheel excites fluorescent powder to obtain a green fluorescent light and a red fluorescent light, which green fluorescent light and red fluorescent light may also be called as excited light. The fluorescent light has a relatively wide wavelength range, but saturation of this color is not insufficient, therefore a long wavelength portion of green light and a short wavelength portion of red light are filtered out by a notch filter 71 to improve color coordinates of green light and red light. In addition, due to high efficiency of the green fluorescent light and low efficiency of the red fluorescent light, i.e., there is insufficient red light and excessive green light in the three primary colors, the excessive green light is usually filtered out in an electronic correction method in order to ensure that the color coordinate the three primary colors for forming white light meet the requirements on color gamut standard.

Through the above-mentioned method of expanding the color gamut, the Rec. 709 or DCI color gamut standard may be reached, but a considerable portion of the fluorescent light is filtered out during the filtering process through the notch filter and the electronic calibration process, resulting in a decrease in light efficiency of the projection apparatus and thus a reduction of final brightness, and leading to limited performance of the projection product. In order to further solve the contradiction between expanding the color gamut and increasing the brightness, a manner of adding a red laser module to the light source is proposed. As shown in FIG. 2, the blue laser module is divided into two parts, in which one part is configured to emit an excitation light incident on the color wheel to generate a green light and a red light, and the other part is configured to emit a blue light for display. In addition, a red laser module is added, the red light color coordinate is adjusted and a proportion of red light is increased through combination of red laser light and red fluorescent light, so that the proportion of red fluorescent light filtered out by the notch filter may be reduced and the excessive green light may be alleviated, thereby improving light effect of the projector.

However, after adding a red laser module to the light source, there is still fluorescent light loss in the process of combining the red laser light with red fluorescent light. As shown in FIG. 2, the red laser light and the red fluorescent light are combined through a dichroic film 61. The dichroic film transmits the red laser light and the blue laser light, and reflects the red fluorescent light and the green fluorescent light. Generally, a red laser device with a primary wavelength of 638 nm and a spectral width of several nanometers is used, while red fluorescent light is a broad-spectrum light, which partially overlaps with the spectrum of the red laser light. When the dichroic film combines light, there is a loss in the red fluorescent light at a wavelength region around 638 nm, but the red fluorescent light in this range has high purity and accounts for a large proportion, resulting in a decrease of light efficiency of the red fluorescent light.

In order to further improve light efficiency of the fluorescent light during combining laser light with fluorescent light, it is proposed to combine light by using the etendue difference between the laser light and the fluorescent light. As shown in FIG. 3(*a*), the process of fluorescent powder 51 being excited to produce fluorescent light follows Lambertian scattering and the etendue is large. The laser light emitted by the laser device 52 is approximately parallel light after passing through a collimation lens, and the etendue is small. The fluorescent light is collimated by the light collection device and then combined with the red laser light at the regional coating film 53. As shown in FIG. 3(*b*), the regional coating film is divided into a transmission region 41 and a red laser reflection region 42. The laser light has a small etendue, and is reflected after being collimated at the center of the coating film after passing through the focusing lens. The fluorescent light has a large etendue, the light spot incident on regional coating film is large, most of the fluorescent light is transmitted by the coating film, and loss of the red fluorescent light overlapping with the red laser light having same wavelength only occur at the location of the regional coating film. Therefore, such a method of combining light by using the etendue may further reduce the loss of the red fluorescent light and improve light efficiency.

However, the larger the color gamut required by the projection system, the greater the proportion of red excited light in the light source. In addition, the color coordinates of the green fluorescent light may no longer meet the color gamut standard requirements, and thus a green laser module is required. It is difficult to increase the proportion of laser light by increasing a driving current. Generally, the number of laser devices is increased to increase the proportion of laser light during a process of combining laser light with fluorescent light. In an actual light source, the laser devices are arranged in an array form. If the number of laser devices increases, the larger the array area of the laser light spot emitted from the laser device, the larger the laser light spot corresponding to the focal location of the regional coating film, that is, the larger size of the regional coating film. Therefore, during the process of combing the laser light and the fluorescent light, loss of the fluorescent light also increases as the region increases. In addition, since the regional coating film needs to reflect both of red laser light and green laser light (the red laser light and green laser light may also be called supplementary light) and transmit fluorescent light, a coating process is more difficult and thus the cost is increased. Therefore, in the case of a larger color gamut (such as Rec. 2020), it is not practical to use etendue for light combination.

SUMMARY

In view of this, the present disclosure proposes a new light source device with a wide color gamut for combining an excited light and a supplementary light, which may realize increase in the proportion of supplementary light during light combination and avoid efficiency reduction of the excited light. In addition, the present disclosure also proposes a display apparatus using the above light source device.

A light source device, including: an excitation light source; a supplementary light source; and a color wheel, wherein the excitation light source is configured to emit a first color light to the color wheel, the color wheel includes a first light-emitting region, a wavelength conversion region, and a supplementary light-emitting region, the first light-emitting region and the wavelength conversion region are sequentially arranged along a circumferential direction, the first light-emitting region is configured to receive the first color light in a first time period and emit the first color light, and the wavelength conversion region is configured to receive the first color light in a second time period and emit an excited light, and the supplementary light-emitting region is located on an inner side or an outer side of the wavelength conversion region, and the supplementary light source is configured to emit, during the second time period, a supplementary light that broadens a color gamut and at least partially overlaps with a spectrum of the excited light, and the supplementary light exiting from the supplementary light-emitting region is combined with the excited light exiting from the wavelength conversion region.

A display apparatus, including a light source device and a spatial light modulator, the light source device is configured to emit light to the spatial light modulator, and the spatial light modulator is configured to modulate the light emitted by the light source device according to image data to generate an image light, the light source device includes: an excitation light source; a supplementary light source; and a color wheel, wherein the excitation light source is configured to emit a first color light to the color wheel, the color wheel includes a first light-emitting region, a wavelength conversion region, and a supplementary light-emitting region, the first light-emitting region and the wavelength conversion region are sequentially arranged along a circumferential direction, the first light-emitting region is configured to receive the first color light in a first time period and emit the first color light, and the wavelength conversion region is configured to receive the first color light in a second time period and emit an excited light, and the supplementary light-emitting region is located on an inner side or an outer side of the wavelength conversion region, and the supplementary light source is configured to emit, during the second time period, a supplementary light that broadens a color gamut and at least partially overlaps with a spectrum of the excited light, and the supplementary light exiting from the supplementary light-emitting region is combined with the excited light exiting from the wavelength conversion region.

Compared with the related art, the light source device of the present disclosure adopts a manner for combining the supplementary light and the excited light suitable for a wide color gamut standard. The supplementary light is transmitted from the supplementary light-emitting region with a scattering layer on the reflective color wheel to complete combination of the supplementary light and the excited light, so as to increase in the proportion of supplementary light, and avoid the increasing loss of excited light caused by expansion of the color gamut under the existing etendue light combination, thereby possessing important practical utility.

REFERENCE SIGNS

Figure 1:
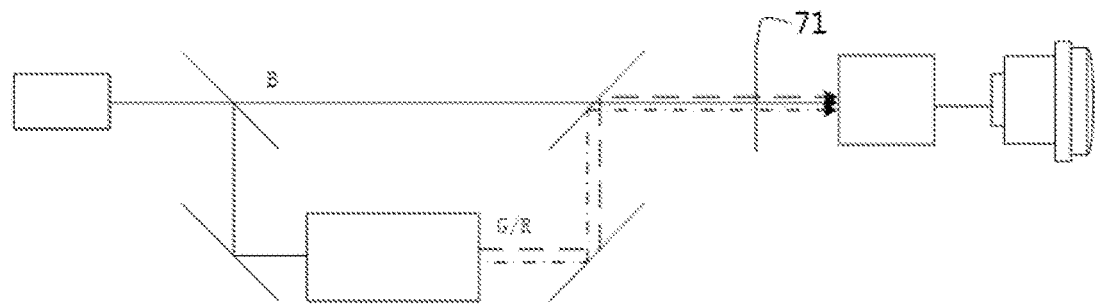
FIG. 1 to FIG. 3 are schematic diagrams of structures and optical paths of three light source devices in the related art.
Figure 2:
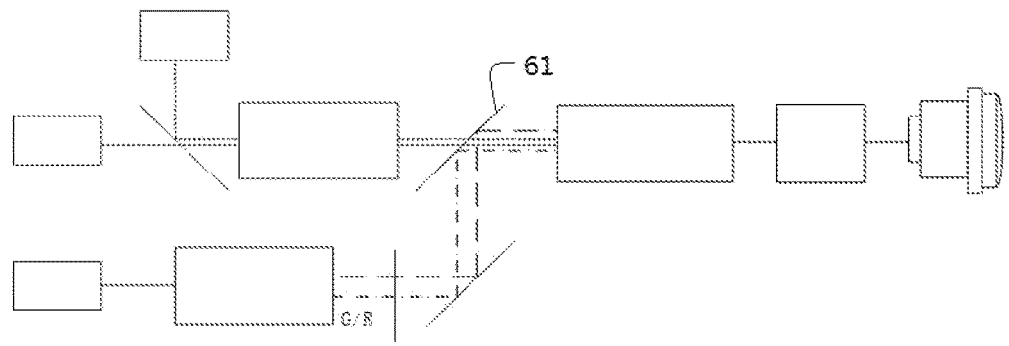
Figure 3A:
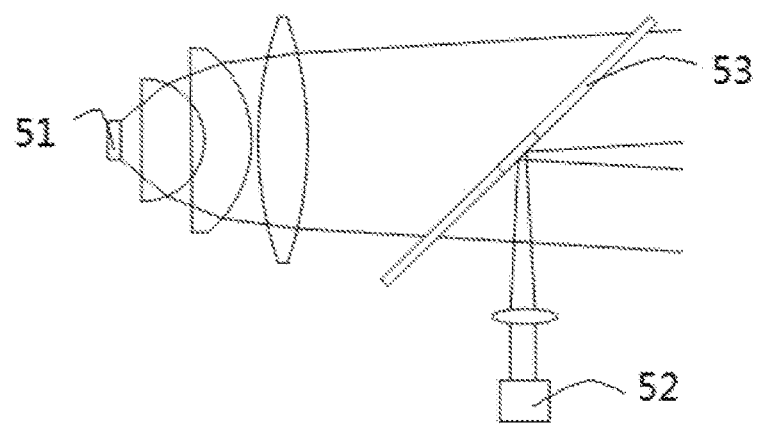
Figure 3B:
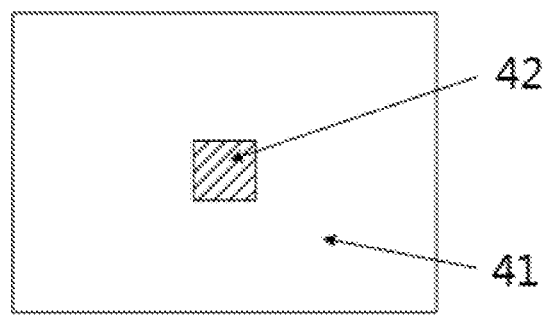

Light source device 100, 200, 300
First light source 101a, 201a, 301a
Second light source 101b, 201b, 301b
Supplementary light source 102
Second color laser light source 102a, 202a, 302a
Third color laser light source 102b, 202b, 302b
Dichroic film 109, 209, 309
Polarization light splitter 103, 203, 303
First region 103a
Second region 103b
Light deflector 104, 204, 304
Color wheel 108, 208, 308
First light-emitting region 108a, 208a
Wavelength conversion region 108b, 208b
Supplementary light-emitting region 108c, 208c
First lens 105, 205, 305
Second lens 106, 206, 306
Collimation lens 111, 211, 311
Light collection device 110, 210, 310
Light deflection structure 104a
Driving device 104b
Aperture 107a
Reflective concave surface 107b
Filter region 208d
Regional coating film 207
Third region 207b
Fourth region 207c
Collection lens assembly 218, 318
Relay lens 212, 312

Guide element 213, 313
Mirror 315

The following specific embodiments will further illustrate the present disclosure in conjunction with the above drawings.

DESCRIPTION OF EMBODIMENTS

Figure 4:
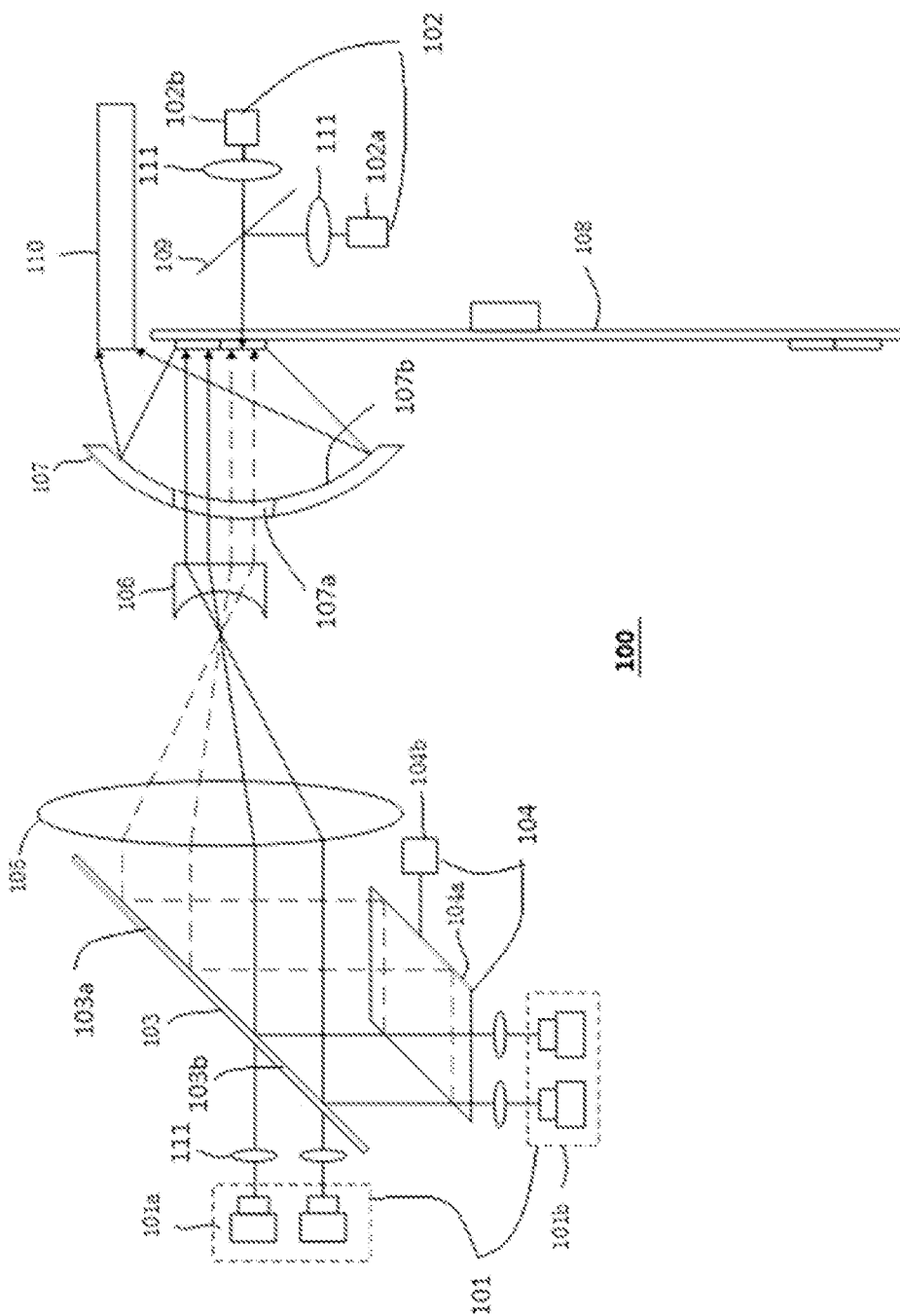
FIG. 4 is a structural schematic diagram of a light source device according to a first embodiment of the present disclosure.

Referring to FIG. 4, FIG. 4 is a structural schematic diagram of a light source device according to a first embodiment of the present disclosure. The light source device 100 includes an excitation light source 101, a supplementary light source 102, a dichroic film 109, a color wheel 108, a polarization light splitter 103, a light deflection structure 104, a first lens 105, a second lens 106, a collimation lens 111, a guide device 107 and a light collection device 110.

The excitation light source 101 is configured to emit a first color light to the color wheel 108. The excitation light source 101 includes a first light source 101a for emitting a first color light having a first polarization state and second light source 101b for emitting a first color light having a second polarization state. The first light source 101a may include two or more laser devices arranged in an array, and each of which may be provided with a collimation lens 111 for collimating the first color light emitted by each laser device. In this embodiment, the first color light is a blue light. The first light source 101a and the second light source 101b are both blue laser light sources. The first color light having the first polarization state is a blue P light, the first color light having the second polarization state is a blue S light, both of which are laser light.

Figure 5:
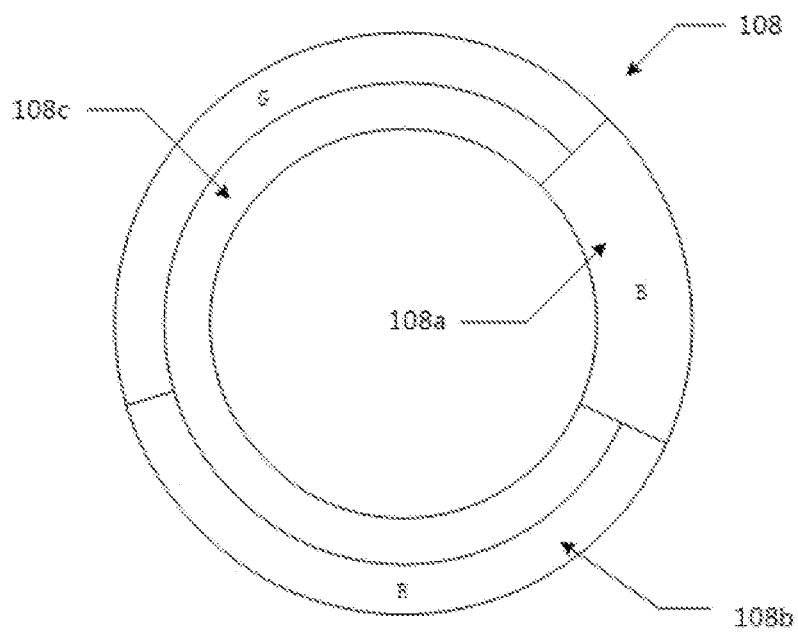
FIG. 5 is a plain view of a color wheel of the light source device shown in FIG. 4.

Referring to FIG. 5, FIG. 5 is a plain view of a color wheel 108 of the light source device shown in FIG. 4. The color wheel 108 includes a first light-emitting region 108a, a wavelength conversion region 108b, and a supplementary light-emitting region 108c. The first light-emitting region 108a and the wavelength conversion region 108b are sequentially arranged in a circumferential direction. The first light-emitting region 108a receives the first color light in a first time period and emits the first color light. The wavelength conversion region 108b receives the first color light in a second time period to generate an excited light and reflect the excited light. The supplementary light-emitting region 108c is located on an inner side or outer side of the wavelength conversion region 108b. The supplementary light-emitting region 108c is a transmission region and includes a scattering layer. The supplementary light emitted by the supplementary light source 102 in the second time period is transmitted and scattered through the supplementary light-emitting region 108c to be combined with the excited light emitted from the wavelength conversion region 108b. The supplementary light is configured to broaden the color gamut and at least partially overlaps with the excited light spectrum. It is appreciated that, in this embodiment, the first light-emitting region 108a and the wavelength conversion region 108b are reflective regions, the supplementary light-emitting region 108c is a transmission region, and combination of the first color light and the excited light is completed at the color wheel 108. However, it is also appreciated that in a modified embodiment, the first light-emitting region 108a and the wavelength conversion region 108b may also be the transmission regions and the supplementary light-emitting region 108c may be the reflective region, so that combination of the first color light and the excited light may be completed at the color wheel 108. Therefore, transmission and reflection properties the regions of the color wheel 108 are not limited thereto, and may be set according to actual requirements.

In this embodiment, since the first light-emitting region 108a emits the first color which is a blue light, the first light-emitting region 108a may also be labeled as a first light-emitting region B. Further, the first light-emitting region 108a also includes a scattering layer. That is, the first light-emitting region 108a is configured to receive, scatter and reflect the first color light. The supplementary light-emitting region 108c may be located on an inner side of the wavelength conversion region 108b, and a sum of the width of the supplementary light-emitting region 108c and the width of the wavelength conversion region 108b may be equal to the width of the first light-emitting region 108a, so that the first light-emitting region 108a, the wavelength conversion region 108b and the supplementary light-emitting region 108c enclose a complete circle.

The excited light exiting from the wavelength conversion region 108b includes a second color excited light and a third color excited light. The second color may be one of red and green, and the third color may be the other one of red and green. The wavelength conversion region 108b includes a second color wavelength conversion region R that emits a second color excited light, and a third color wavelength conversion region G that emits a third color excited light. It is appreciated that the second color wavelength conversion region R may be provided with a red wavelength conversion material, and the third color wavelength conversion region may be provided with a green wavelength conversion material.

Further, the supplementary light may also include a second color laser light and a third color laser light. That is, the supplementary light source 102 includes a second color laser light source 102a and a third color laser light source 102b. The second color laser light source 102a is turned on when the second color wavelength conversion region R emits the second color excited light, and the third color laser light source 102b is turned on when the third color wavelength conversion region G emits the third color excited light. The second color laser light source 102a emits the second color laser light to the dichroic film 109, and the third color laser light source 102b emits the third color laser light to the dichroic film 109. The dichroic film 109 is configured to guide the second color laser light and the third color laser light to the supplementary light-emitting region 108c. It is appreciated that, a collimation lens 111 may be provided in front of each of the second color laser light source 102a and the third color laser light source 102b so as to collimate the second color laser light and the third color laser light.

The polarization light splitter 103 has a first region 103a and a second region 103b. The second region 103b is configured to receive the first color light having the first polarization state emitted by the first light source 101a. The light deflector 104 is provided between the second light source 101b and the polarization light splitter 103, and is configured to control the first color light having the second polarization state emitted by the second light source 101b to be incident in the first region 103a in the first time period and incident in the second region 103b in the second time period. In an embodiment of the present disclosure, in the first time period, the first region 103a emits the first color light having the second polarization state to the first light-emitting region 108a of the color wheel 108, and the second region 103b emits the first color light having the first polarization state which reaches the first light-emitting region 108a, and the first light-emitting region 108a emits the first color light having the first polarization state and the first color light having the second polarization state. In the second time period, the second region 103b emits the first color light having the first polarization state and the first color light having the second polarization state to the wavelength conversion region 108b, the wavelength conversion region 108b emits the excited light, and the supplementary light source 102 emits supplementary light with the same color as the excited light to the supplementary light-emitting region 108c. Since the wavelength conversion region 108b is arranged adjacent to the supplementary light-emitting region, a light spot of the excited light of the wavelength conversion region 108b and a light spot of the supplementary light of the supplementary light-emitting region 108c are adjacent to each other and exit in the same direction. That is, the excited light emitted from the wavelength conversion region 108b may be combined with the same color supplementary light emitted from the supplementary light-emitting region 108c at the color wheel 108.

In this embodiment, in the first time period, the light spot of the first color light having the first polarization state and the light spot of the first color light having the second polarization state on the first light-emitting region 108a are both rectangular light spots. The light spot of the first color light having the first polarization state and the light spot of the first color light having the second polarization state on the first light-emitting region 108a are arranged side by side and adjacent to each other, and these two light spots also form a light spot of the first color light. In the second time period, the light spot of the excited light of the wavelength conversion region 108b and the light spot of the supplementary light of the supplementary light-emitting region 108c are arranged side by side and adjacent to each other.

Figure 6:
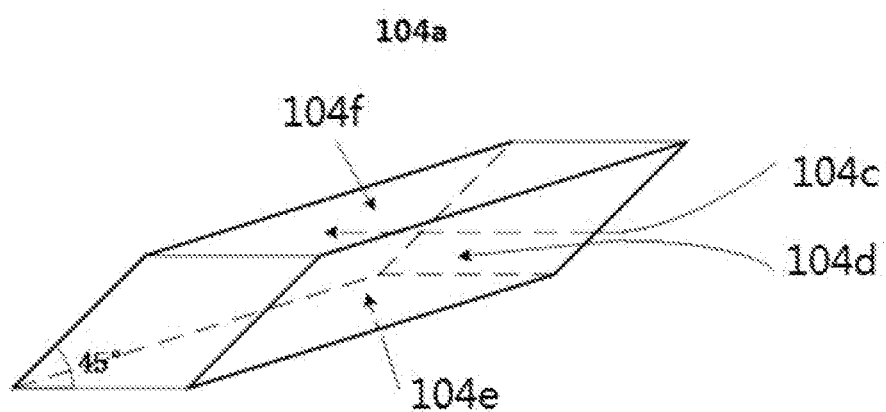
FIG. 6 is a structural schematic diagram of a light deflector of the light source device shown in FIG. 4.

Referring to FIG. 6, FIG. 6 is a structural schematic diagram of a light deflector 104 of the light source device 100 shown in FIG. 4. The light deflector 104 includes a light deflection structure 104a and a driving structure 104b. The light deflection structure 104a is configured to change an optical path of incident light, and the driving structure 104b is configured to control whether the light deflection structure 104a is located in the optical path of the first color light having the second polarization state emitted by the light source 101b. In an embodiment of the present disclosure, the light deflection structure 104a has a first reflection surface 104c and a second reflection surface 104d that are opposite to each other. After the first color light having the second polarization state is sequentially reflected by the reflection surface 104c and the second reflection surface 104d, its optical path is deflected by an offset. In this embodiment, the light deflection structure 104a includes an optical rod having a parallelogram cross section. The optical rod includes an incident surface 104e and an exit surface 104f that are parallel to each other. The reflection surface 104c and the second reflection surface 104d are parallel to each other and are both connected between the incident surface 104e and the exit surface 104f. An angle between the first reflection surface 104c and the incident surface 104e is 45 degrees. However, in a modified embodiment, the light deflection structure 104a may also include a first mirror having the first reflection surface and a second mirror having the second reflection surface that are arranged parallel to each other, the first mirror is configured to receive and reflect the first color light having the second polarization state to the second mirror, and the second mirror is configured to receive and reflect the light having the second polarization state to the polarization light splitter 103.

The first lens 105 is located between the polarization light splitter 103 and the second lens 106. The second lens 106 is located between the first lens 105 and the color wheel 108. The first lens 105 may be a convex lens for converging the first color light exiting from the polarization light splitter 103 and then guiding it to the second lens 106. The second lens 106 may be a concave lens for collimating the first color light exiting from the first lens 105 and then providing it to the color wheel 108.

The guide device 107 is located between the polarization light splitter 103 and the color wheel 108. In an embodiment of the present disclosure, the guide device 107 may be located between the second lens 106 and the color wheel 108. The first color light having the first polarization state and the first color light having the second polarization state exiting from the polarization light splitter 103 are guided to the color wheel 108 through the guide device 107. The guide device 107 receives the excited light emitted from the wavelength conversion region 108b, the supplementary light exiting from the supplementary light-emitting region 108c and the first color light exiting from the first light-emitting region 108a, and guides the excited light, the supplementary light and the first color light to the light collection device 110.

In this embodiment, the guide device 107 includes a reflection bowl. The reflection bowl includes an aperture 107a and a reflective concave surface 107b located at the periphery of the aperture 107a. The first color light having the first polarization state and the first color light having the second polarization state exiting from the polarization light splitter 103 are guided to the color wheel 108 through the aperture 107a. The reflective concave surface 107b receives and reflects the excited light, the supplementary light, and the first color light exiting from the color wheel 108 to the light collection device 110.

The light collection device 110 may be a square rod, which is arranged at one side (such as an upper side) of the color wheel 108. The excited light, the supplementary light and the first color light guided by the guide device 107 are all guided to an inlet of the square rod, and enters the back-end opto-mechanical apparatus (e.g., a spatial light modulation system) after homogenization by the square rod so as to be modulated to an image light for displaying images.

The optical path configuration when the light source device 100 is working is introduced below. When the light source device 100 is working, the driving device 104b controls the light deflection structure 104a to move periodically, so that the light deflection structure 104a is periodically located in the optical path of the first color light having the second polarization state emitted by the second light source 101b. The color wheel 108 also continuously rotates, so that the first light-emitting region 108a and the wavelength conversion region 108b are sequentially located in the optical path of the first color light exiting from the polarization light splitter 103. When the wavelength conversion region 108b emits an excited light, the supplementary light source 102 emits a supplementary light of the same color as the excited light, so that the first light-emitting region 108a emits the first color light in the first time period. The wavelength conversion region 108b and the supplementary light-emitting region 108c emit a combined light of the excited light and the supplementary light in the second time period.

Figure 7:
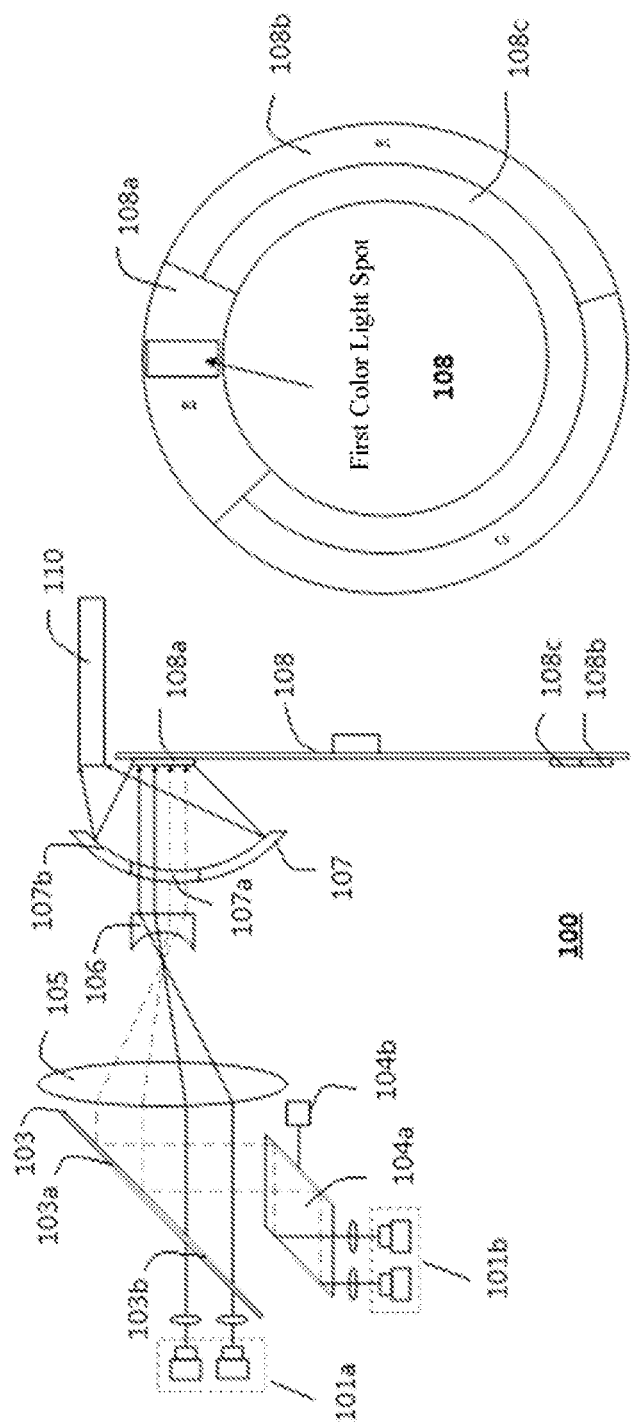
FIG. 7 is a schematic diagram of an optical path configuration of the light source device shown in FIG. 4 in a first time period.

In an embodiment of the present disclosure, referring to FIG. 7, in the first time period, the driving device 104b controls the light deflection structure 104a to be located in the optical path of the first color light having the second polarization state emitted by the second light source 101b, the first light source 101a emits the first color light having the first polarization state to the second region 103b of the polarization light splitter 103, and the second light source 101b emits the first color light having the second polarization state to the first region 103a of the polarization light splitter 103 through the light deflection structure 104a. The second region 103b may transmit the first color light having the first polarization state and reflect the first color light having the second polarization state. The first region 103a may reflect the first color light having the second polarization state. The light spot of the first color light having the first polarization state may be separated from the light spot of the first color light having the second polarization state. The first color light having the first polarization state is incident on a lower half of the first lens 105, and the first color light having the second polarization state is incident on an upper half of the first lens 105. The first lens 105 guides the first color light having the first polarization state and the first color light having the second polarization state to converge in front of the second lens 106. The first color light having the first polarization state and the first color light having the second polarization state are collimated by the second lens 106, and transmitted to the first light-emitting region 108a of the color wheel 108 through the aperture 107a of the guide device 107. The first color light having the first polarization state may be imaged on an upper half of the first light-emitting region 108a, and the first color light having the second polarization state may be imaged on a lower half of the first light-emitting region. A total width of the light spot of the first color light having the first polarization state and the first color light having the second polarization state formed on the first light-emitting region 108a is approximately equal to a width of the first light-emitting region 108a. The first color light exiting from the second lens 106 is scattered and reflected through the first light-emitting region 108a, and then provided to the reflective concave surface 107b. The reflective concave surface 107b reflects the first color light to an inlet of the light collection device 110, and the light collection device 110 further combines and homogenizes the first color light and then provides it to a back-end device for further processing, e.g., provided to an back-end opto-mechanical apparatus (e.g., a spatial light modulation system), so as to be modulated to a first color image light for displaying images.

Figure 8:
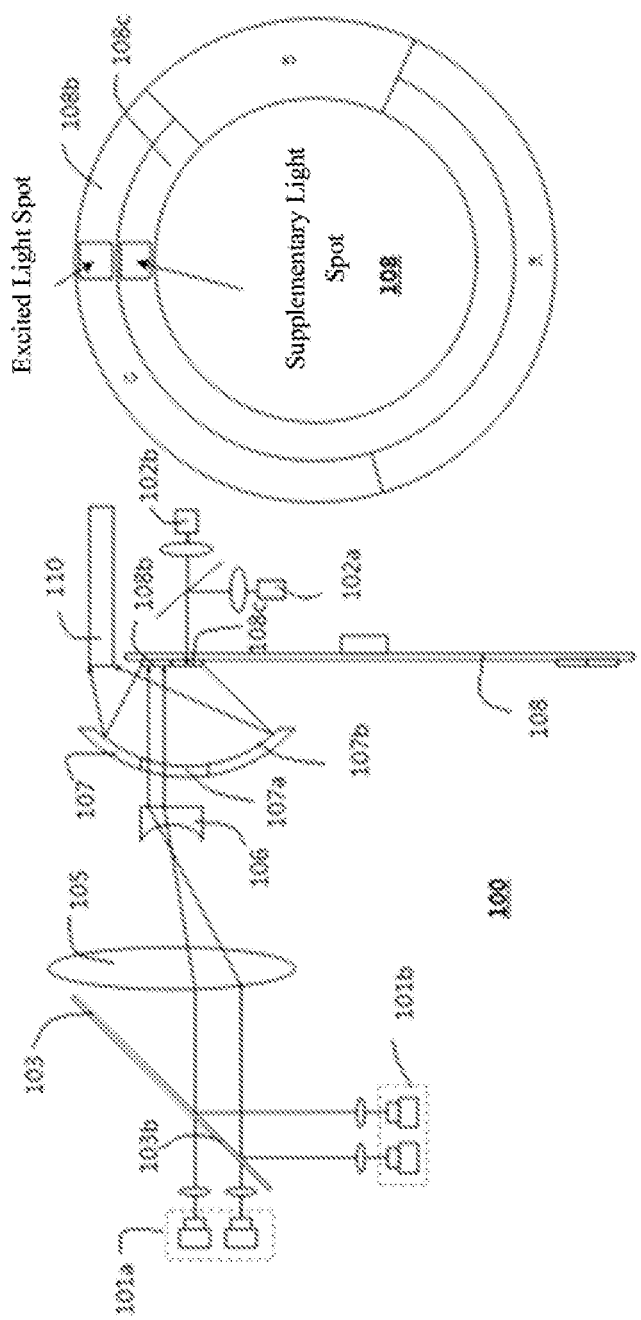
FIG. 8 is a schematic diagram of an optical path configuration of the light source device shown in FIG. 4 in a second time period.

Referring to FIG. 8, in the second time period, the driving device 104b controls the light deflection structure 104a so that the light deflection structure 104a is not located in the optical path of the first color light having the second polarization state emitted by the second light source 101b, the first light source 101a emits the first color light having the first polarization state to the second region 103b of the polarization light splitter 103, and the second light source 101b also emits the first color light having the second polarization state to the second region 103b of the polarization light splitter 103. The second region 103b combines the first color light having the first polarization state with the first color light having the second polarization state. The second region 103b may transmit the first color light having the first polarization state and reflect the first color light having the second polarization state so as to combine the first color light having the first polarization state and the first color light having the second polarization state. The light spot of the first color light having the first polarization state may coincide with the light spot of the first color light having the second polarization state. The combined first color light is incident on the first lens 105. The first lens 105 is a convex lens, and the combined first color light is incident on a lower half of the first lens 105, so that the combined first color light is guided to converge in front of the second lens 106. The second lens 106 collimates the converged first color light. The collimated first color light is transmitted to the wavelength conversion region 108b of the color wheel 108 through the aperture 107a of the guide device 107.

In the second time period, when the first color light is incident on the second color wavelength conversion region R of the wavelength conversion region 108b, a width of the light spot of the first color light formed on the wavelength conversion region 108b is approximately equal to the width of the wavelength conversion region 108b. The second color wavelength conversion material on the second color wavelength conversion region R is excited to generate a second color excited light. The second color excited light is reflected to the reflective concave surface 107b of the guide device 107. The second color laser light source 102a of the supplementary light source 102 is turned on, and the third color laser light source 102b is turned off. The second color laser light source 102a emits the second color laser light to a part of the supplementary light-emitting region 108c adjacent to the second color wavelength conversion region R. A width of the light spot of the second color laser light on the part of the supplementary light-emitting region 108c is approximately equal to the width of the supplementary light-emitting region 108c. The part of the supplementary light-emitting region 108c transmits and scatters the second color laser light, so that the second color laser light of the supplementary light-emitting region 108c is combined with the second color excited light emitted from the second color wavelength conversion region R. The scattered second color laser light is also guided to the reflective concave surface 107b. The reflective concave surface 107b reflects both of the second color excited light and the second color laser light to the inlet of the light collection device 110. The light collection device 110 further combines and homogenizes the second color excited light and the second color laser light and then provides them to a back-end device for further processing, e.g., provided to an back-end opto-mechanical apparatus (e.g., a spatial light modulation system), so as to be modulated to a second color image light for displaying images. After the second color excited light and the second color laser light are homogenized through the light collection device 110 to form a uniform light spot. Speckle effect of the laser light is well eliminated because the laser light and the excited light are mixed homogeneously.

In the second time period, when the first color light is incident on the third color wavelength conversion region G of the wavelength conversion region 108b, the third color wavelength conversion material on the third color wavelength conversion region G is excited to generate a third color excited light. The third color excited light is reflected to the reflective concave surface 107b of the guide device 107. The third color laser light source 102b of the supplementary light source 102 is turned on and the second color laser light source 102a is turned off. The third color laser light source 102b emits a third color laser light to a part of the supplementary light-emitting region 108c adjacent to the third color wavelength conversion region R. The part of the supplementary light-emitting region 108c transmits and scatters the third color laser light, so that the third color laser light of the supplementary light-emitting region 108c combines with the third color excited light exiting from the third color wavelength conversion region G. The scattered third color laser light is also guided to the reflection concave surface 107b. The reflective concave surface 107b reflects both the third color excited light and the third color laser light to an inlet of the light collection device 110. The light collection device 110 further combines and homogenizes the third color excited light and the third color laser light and then provides them to a back-end device for further processing, e.g., provided to an back-end opto-mechanical apparatus (e.g., a spatial light modulation system), so as to be modulated to a third color image light for displaying images.

Compared with the related art, the light source device 100 of the present disclosure adopts a manner for combining the supplementary light and the excited light suitable for a wide color gamut standard. The supplementary light is transmitted from the supplementary light-emitting region 108c with a scattering layer on the reflective color wheel 108 to complete combination of the supplementary light and the excited light, so as to increase in the proportion of supplementary light, and avoid the increasing loss of excited light caused by expansion of the color gamut under the existing etendue light combination, thereby possessing important practical utility.

Further, in the present disclosure, by causing the first color light emitted from the first light source 101a and the second light source 101b to have different polarization states, and then by causing the first color light in different polarization states to be combined through the polarization light splitter 103, the combined light of the first color is imaged on the color wheel 108 through the first lens 105 and the second lens 106. Since the laser devices of the first light source 101a and the second light source 101b are arranged in an array, the light spots emitted from the first light source 101a and the second light source 101b after passing through the collimator lens 111 are separated from each other, so that the laser light spots imaged on the color wheel 108 may not overlap with each other, thereby reducing laser power density incident on the color wheel 108 and ensuring light effect of the fluorescent light. When the first color light is incident on the color wheel 108 as the exciting light of the excited light, after the first color light having the first polarization state emitted by the first light source 101a is combined with the first color light having the second polarization state emitted by the second light source 101b, the optical paths overlap with each other. At this time, the laser light spots of the first light source 101a and the second light source 101b have the same imaging position on the color wheel 108, and the laser power density incident on the fluorescent powder layer is relatively large, the location of the second light source may be slightly adjusted so that the light spot imaged on the wavelength conversion region 108b of the color wheel 108 is separated from the location of the laser light spot of the first light source 101a, thereby further improving light effect of the excited light.

As shown in FIG. 5, the first light-emitting region 108a of the color wheel 108 corresponding to the first color light display (such as blue light display) is a reflective scattering sheet, the function of which is decoherence and reducing speckle phenomenon of projection display. The display parts corresponding to the second color light and the third color light (such as the green light display part and red light display part) is divided into two concentric circles. An outer circle is a wavelength conversion material layer. The first color light is incident on the wavelength conversion material layer to generate the second color excited light or third color excited light (such as red fluorescent light or green fluorescent light). The supplementary light-emitting region 108c at the inner circle is a scattering layer. The supplementary light source 102 is turned on to emit the second color supplementary light and the third color supplementary light during the time period corresponding to generation of the second color excited light and the third color excited light, and then transmits them through the scattering layer of the color wheel 108, and then combined with the excited light after completing decoherence.

Since the supplementary light source 102 is not turned on during the first color light display period, in order to avoid nonhomogeneous display, it is necessary to ensure that the light spot of first color light emitted from the color wheel 108 is consistent with the spots of the second color light/third color light emitted from the color wheel 108, so that the light spot size and angle being incident on the light collection device 110 are consistent. Therefore, the light deflection structure 104a is modulated to be in an optical path of the laser light emitted from the second light source 101b. At this time, the first color light is offset after being reflected twice by the light deflection structure 104a, and is incident on the location where the second color supplementary light/third color supplementary light is transmitted through the scattering layer, at the same time, the first color light emitted from the first light source 101a is incident on the location corresponding to the wavelength conversion region 108b, thereby ensuring the uniformity of the light spot formed by the first color light.

The excited light generated by the wavelength conversion region of the color wheel 108 and the supplementary light scattered by the transmissive or reflective scattering layer have a large angle when exiting the color wheel. In this embodiment, the reflection bowl with the reflective concave surface 107b collects large-angle light of the color wheel 108. The central region of the reflection bowl is hollowed out to form the aperture 107a. The blue laser light is transmitted through the aperture 107a and then is incident on the color wheel 108. A side of the reflection bowl facing the color wheel 108 is coated with a high reflective film to form the reflective concave surface 107b. Most of the laser light and fluorescent light emitted from the color wheel 108 are reflected by the reflective concave surface 107b of the reflection bowl and then are incident on the light collection device 110.

Figure 9:
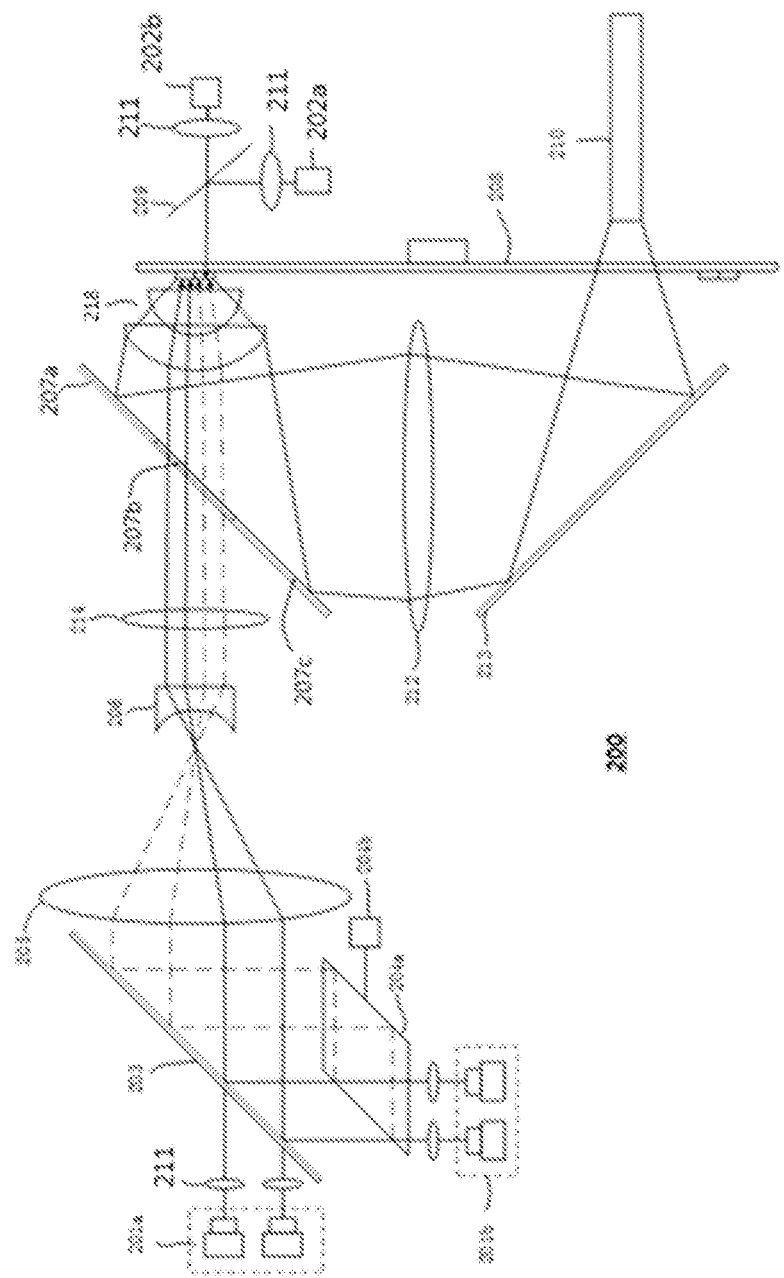
FIG. 9 is a structural schematic diagram of a light source device according to a second embodiment of the present disclosure.
Figure 10:
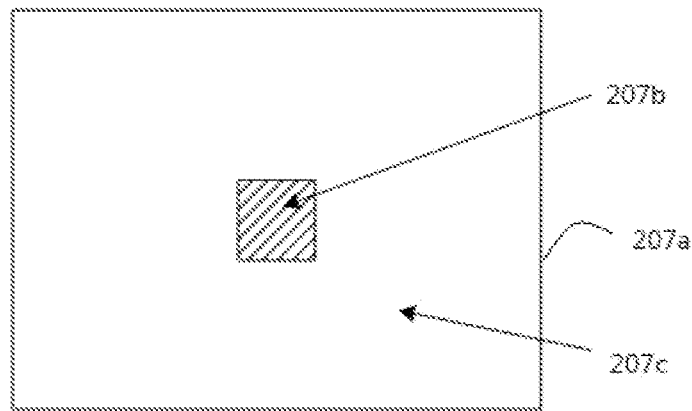
FIG. 10 is a plain view of a regional coating film of the light source device shown in FIG. 9.
Figure 11:
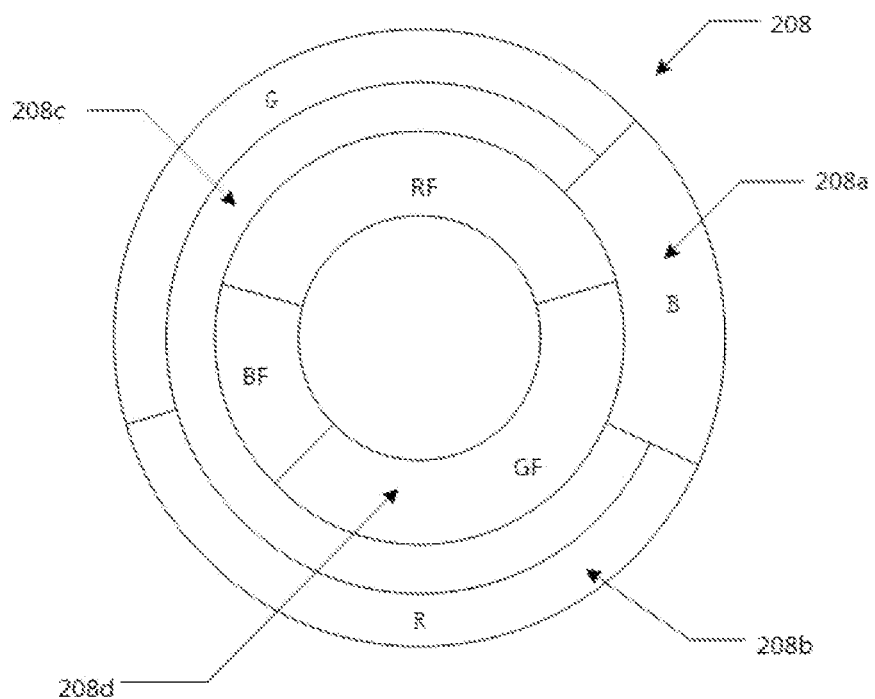
FIG. 11 is a plain view of a color wheel of the light source device shown in FIG. 9.

Referring to FIG. 9, FIG. 10 and FIG. 11, FIG. 9 is a structural schematic diagram of a light source device 200 according to a second embodiment of the present disclosure. FIG. 10 is a plain view of a regional coating film 207 of the guide device 207 of the light source device 200 shown in FIG. 9. FIG. 11 is a plain view of a color wheel 208 of the light source device 200 shown in FIG. 9. The light source device 200 is basically the same as the light source device 100 in the first embodiment. That is, the above description of the light source device 100 is basically applicable to the light source device 200 in the second embodiment. The main difference between the light source device 100 and the light source device 200 lies in that the structure of the guide device 207, the structure of the color wheel 208, and the location of the light collection device 210 are different from those in the first embodiment.

In an embodiment of the present disclosure, the guide device 207 includes a regional coating film 207 and a guide element 213. The regional coating film 207 includes a third region 207b and a fourth region 207c. The third region 207b is a first color light transmission region. The fourth region 207c may be a reflective region. The first color light having the first polarization state and the first color light having the second polarization state exiting from the polarization light splitter 203 are transmitted to the color wheel 208 through the third region 207b. The fourth region 207c receives and reflects the excited light emitted from the wavelength conversion region 208b, the supplementary light emitted from the supplementary light-emitting region 208c, and the first color light emitted from the first light-emitting region 208a to the guide element 213. The guide element 213 guides the excited light, the supplementary light and the first color light to the light collection device 210.

Further, the color wheel 208 further includes a filter region 208d. The guide element 213 guides the excited light, the supplementary light, and the first color light to the filter region 208d. The filter region 208d provides the filtered excited light, the supplementary light and the first color light to the light collection device 210.

Furthermore, the light source device 200 may further include a collection lens assembly 218 and a relay lens 212. The collection lens assembly 218 is located between the regional coating film 207 of the guide device 207 and the color wheel 208. The excited light, the supplementary light, and the first color light are provided to the guide element 213 through the relay lens 212.

It is appreciated that the reflected first color light exiting from the color wheel 208 is collected by the collection lens assembly 218 and then is incident on the regional coating film 207 again. Since the etendue becomes larger after the first color light is scattered, most of the first color light is reflected by the third region 207b of the regional coating film 207, and are incident on the light collection device 210 through the relay lens 212 and the guide element 213. In this embodiment, the light collection device 210 may be located under the color wheel 208.

Further, as shown in FIG. 11, the color wheel 208 may be changed into a concentric three-circle structure. An outermost circle is the wavelength conversion region 208b, the first color light is incident on the wavelength conversion region 208b to generate an excited light. A middle circle is the supplementary light-emitting region 208c having the scattering layer, the supplementary light is transmitted through the supplementary light-emitting region 208c and combined with the excited light, while the first light-emitting region 208a corresponding to the first color display part of the wavelength conversion region 208b and the supplementary light-emitting region 208c is a reflective scattering sheet. An innermost circle is the filter region 208d which is configured to filter out the wavelength part of the laser light having insufficient color saturation in the excited light and expand the color gamut of the projection system. It is appreciated that the filter region 208d may be divided into three regions RF, BF, and GF corresponding to the first color light, the second color excited light, and the third color excited light, respectively.

In the first embodiment, when the guide device 107 of the reflection bowl is use to collect light. The first color light, the excited light and the supplementary light emitted from the color wheel 108 are directly transmitted when they are incident on the aperture 107a of the guide device 107, and loss occurs to all of the first color light, the excited light and the supplementary light. In the second embodiment, the guide device 207 has the collection lens assembly 218, and the regional coating film 207 that transmits the first color light is provided, so that the loss of the excited light and the supplementary light may be effectively reduced. For the first color light, because the polarization state of the first color light is changed after being scattered, it may basically be regarded as a non-polarized light, the regional coating film 207 transmits an incident blue laser light in a specific polarization state and reflects a blue light in another polarization state by using the polarization characteristics of the laser light, thereby further reducing the loss of blue light. In addition, the light collection of the collection lens assembly 218 may effectively reduce the volume of the light source device 200, which is more practical than the guide device 107 of the reflection bowl.

Figure 12:
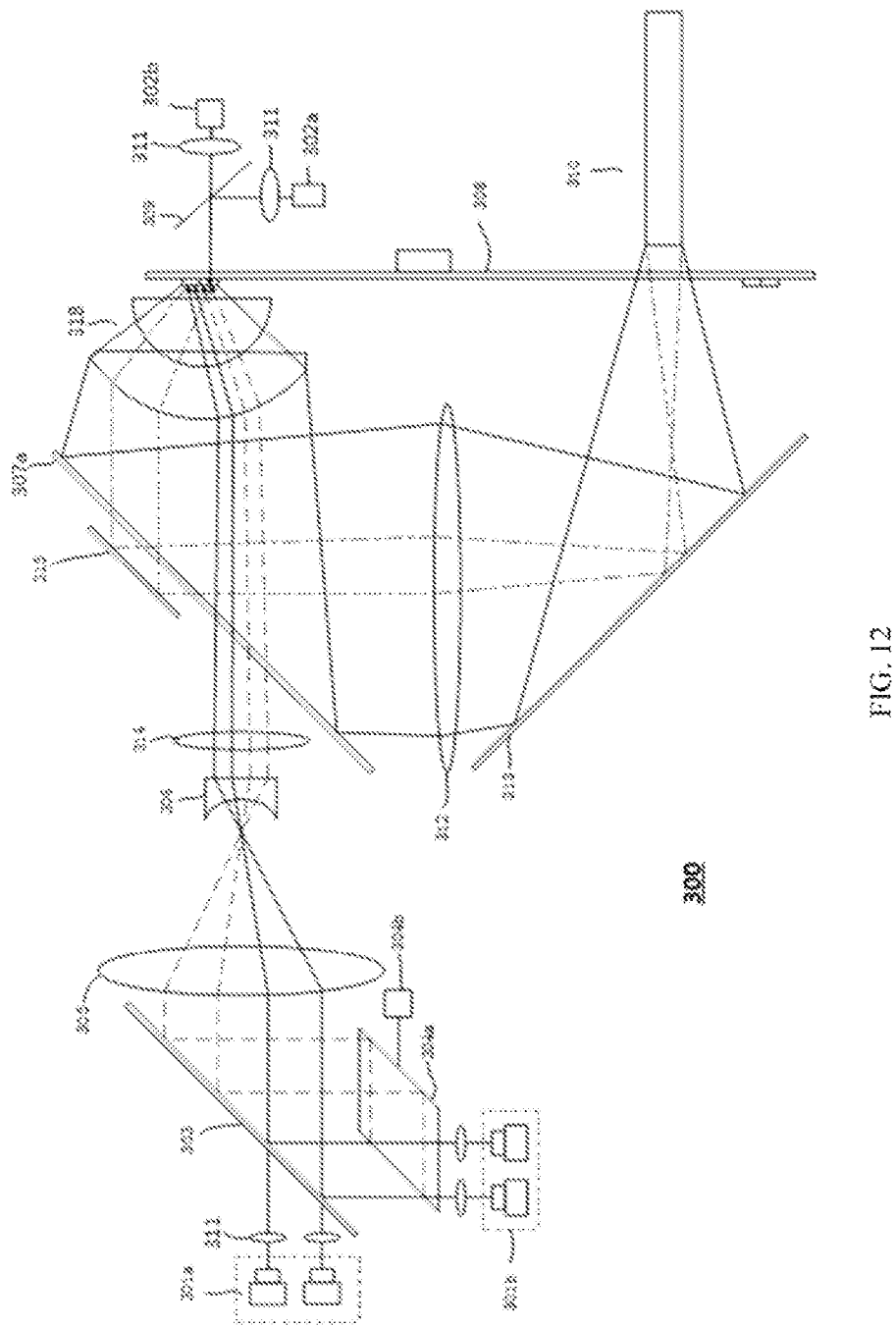
FIG. 12 is a structural schematic diagram of a light source device according to a third embodiment of the present disclosure.

Referring to FIG. 12, FIG. 12 is a structural schematic diagram of a light source device 300 according to a third embodiment of the present disclosure. The light source device 300 is basically the same as the light source device 200 of the second embodiment. In other words, the above description of the light source device 200 is basically applicable to the light source device 300 of the third embodiment. The main difference between the light source device 200 and the light source device 300 lies in that the structure of the guide 307 is different from that in the second embodiment.

In the third embodiment, a dichroic film 307a and a mirror 315 are used instead of the regional coating film 207 in the second embodiment. The first color light having the first polarization state and the first color light having the second polarization state exiting from the polarization light splitter 303 are transmitted to the color wheel 308 through the dichroic film 307a. The dichroic film 307a receives and reflects the excited light exiting from the wavelength conversion region and the supplementary light exiting from the supplementary light-emitting region to the guide element 313 through the collection lens assembly 318. The mirror 315 receives and reflects the first color light exiting from the first light-emitting region to the guide element 313 through the relay lens 312. The guide element 313 guides the excited light, the supplementary light and the first color light to the light collection device 310.

In the third embodiment, the regional coating film is replaced with a dichroic film 307 and a mirror 315, the displayed part on the color wheel 308 corresponding to the first color light is the mirror 315, and the filter segment corresponding to the first color light is a scattering sheet for decoherence of the laser light of the first color and reduction of the speckle phenomenon.

The dichroic film 307a transmits the blue light, reflects the excited light and the supplementary light (that is, reflects the second color light and the third color light). The laser beams of the first color light emitted from an array of the first light source 301a and the second light source 301b are deflected downward relative to the center of the wavelength conversion region and the complementary light-emitting region of the color wheel 308. The first color light is transmitted through the dichroic film 307a and then is obliquely incident on the color wheel 308. The displayed part on the color wheel 308 corresponding to the first color light is reflected. Due to the small etendue of the laser light, the reflected first color light is transmitted through the dichroic film 307a, is then reflected by the mirror 315, and is scattered through the relay lens 312, the guide element 313, and the scattering sheet corresponding to the color filter region on the color wheel 308, and then is incident on the light collection device 310. It is an imaging process from the color wheel 308 to an inlet of the light collection device 310, the light spot of the first color light on the color wheel 308 is the same as the light spot of the second color light and the light spot of the third color light on the color wheel 308. Therefore, given that the aberration introduced by the lens is ignored, the light spot of the first color light incident on the light collection device 310 is also the same as the light spot of the second color light and the light spot of the third color light.

In this embodiment, the lens of the regional coating film is no longer used to the incidence and emission of the first color light on the color wheel 308, which eliminates the region loss when the first color light exits the color wheel 308, and improves the first color light effect and image display effect.

It is appreciated that, since the first light sources 201a, 301a, the second light sources 201b, 301b, the supplementary light sources 202a, 202b, 302a, 302b, the dichroic films 209, 309, the polarization light splitters 203, 303, the light deflection structures 204a, 204b, 304a, 304b, the first light-emitting region, wavelength conversion region and supplementary light-emitting region of the color wheels 208, 308, the first lenses 205, 305, the second lenses 206, 306, the collimation lenses 211, 311 and the light collection devices 210, 310 in the second embodiment and third embodiment above are basically the same as the first light source 101a, the second light source 101b, the supplementary light sources 102a, 102b, the dichroic film 109, the polarization light splitter 103, and the light deflection structures 104a, 104b, the first light-emitting region, the wavelength conversion region and the supplementary light-emitting region of the color wheel 108, the first lens 105, the second lens 106, the collimation lens 111 and the light collection device 110 in the first embodiment, the structures thereof in the second and third embodiments are not elaborated without affecting understanding of those skilled in the art to the present disclosure.

The present disclosure also provides a display apparatus, which may be applied to projectors, LCDs (Liquid Crystal Display), and the like. The display apparatus may include a light source device, a spatial light modulator, and a projection lens. The light source device adopts the light source devices 100, 200, 300 in the above-mentioned embodiments and the light source devices in the modified embodiments thereof. The spatial light modulator is configured to modulate an image according to the light emitted by the light source device and input image data so as to output an image light. The projection lens is configured to project according to the image light to display a projected image. The display apparatus including the light source device such as the light source devices 100, 200, 300 in the above-mentioned embodiments and the light source devices in the modified embodiments thereof has the following technical effects: high brightness, compact structure, and small volume.

In addition, it is appreciated that the light source devices 100, 200, 300 in the above-mentioned embodiments of the present disclosure and the light source devices in the modified embodiments may also be used in stage lighting systems, vehicle lighting systems, surgical lighting systems, and the like, and are not limited to the above display apparatus.

It is appreciated that, in each of the above embodiments, "guiding" for various light beams by the various elements such as a light splitting element, a guide element, and a light combining element, may either be a "transmissive" type or "reflective" type. Wavelength splitting/combining, polarization splitting/combining, and/or region splitting/combining may all be realized. Since it is not possible to illustrate the various modified embodiments one by one, the modified embodiments are not elaborated herein. However, those skilled in the art may complete a variety of modified embodiments based on the contents recorded in this disclosure so as to realize "guiding" for various light beams.

The above are only embodiments of the present disclosure, and do not limit the scope of the present disclosure. Any equivalent structure or equivalent process transformation made by using the contents of the description and drawings of the present disclosure, or directly or indirectly applied to other related art, are included in the protection scope of the present disclosure.

What is claimed is:

1. A light source device, comprising an excitation light source, a supplementary light source, and a color wheel, wherein:
   the excitation light source is configured to emit a first color light to the color wheel;
   the color wheel comprises a first light-emitting region, a wavelength conversion region, and a supplementary light-emitting region, the first light-emitting region and the wavelength conversion region are sequentially arranged along a circumferential direction, the first light-emitting region is configured to receive the first color light in a first time period and emit the first color light, and the wavelength conversion region is configured to receive the first color light in a second time period and emit an excited light; and
   the supplementary light-emitting region is located on an inner side or an outer side of the wavelength conversion region, and the supplementary light source is configured to emit, during the second time period, a supplementary light that broadens a color gamut and at least partially overlaps with a spectrum of the excited light, and the supplementary light exiting from the supplementary light-emitting region is combined with the excited light exiting from the wavelength conversion region.

2. The light source device according to claim 1, further comprising a polarization light splitter, and a light deflector, wherein:
   the excitation light source comprises a first light source configured to emit the first color light having a first polarization state and a second light source configured to emit the first color light having a second polarization state, the polarization light splitter comprises a first region and a second region, the second region is configured to receive the first color light having the first polarization state emitted by the first light source, the light deflector is arranged between the second light source and the polarization light splitter and is configured to control the first color light having the second polarization state emitted by the second light source to be incident in the first region in the first time period and incident in the second region in the second time period;
   in the first time period, the first region is configured to emit the first color light having the second polarization state to the first light-emitting region, the second region is configured to emit the first color light having the first polarization state to the first light-emitting region, and the first light-emitting region is configured to combine the first color light having the first polarization state with the first color light having the second polarization state, and emit a combined light of the first color light having the first polarization state and the first color light having the second polarization state; and
   in the second time period, the second region is configured to emit the first color light having the first polarization state and the first color light having the second polarization state to the wavelength conversion region, the wavelength conversion region is configured to emit the excited light, and the supplementary light source is configured to emit the supplementary light to the supplementary light-emitting region.

3. The light source device according to claim 2, wherein in the first time period, on the first light-emitting region, a light spot of the first color light having the first polarization state and a light spot of the first color light having the second polarization state are arranged side by side and adjacent to each other; and in the second time period, a light spot, on the wavelength conversion region, of the excited light and a light spot, on the supplementary light-emitting region, of the supplementary light are arranged side by side and adjacent to each other.

4. The light source device according to claim 2, wherein the light deflector comprises a light deflection structure and a driving structure, the light deflection structure is configured to change an optical path of an incident light, and the driving structure is configured to control as to whether the light deflection structure is located on an optical path of the first color light having the second polarization state or not.

5. The light source device according to claim 4, wherein the light deflection structure comprises a first reflection surface and a second reflection surface that are opposite to each other, and after the first color light having the second polarization state is sequentially reflected by the reflection surface and the second reflection surface, the optical path of the first color light having the second polarization state is deflected by an offset.

6. The light source device according to claim 5, wherein the light deflection structure comprises an optical rod having a parallelogram cross section, the optical rod comprises an incident surface and an exit surface that are parallel to each other, the first reflection surface and the second reflection surface are parallel to each other and are both connected between the incident surface and the exit surface.

7. The light source device according to claim 2, further comprising:
a guide device; and
a light collection device,
wherein the guide device is located between the polarization light splitter and the color wheel, and the first color light having the first polarization state and the first color light having the second polarization state exiting from the polarization light splitter are guided to the color wheel through the guide device, the guide device is further configured to receive the excited light emitted from the wavelength conversion region, the supplementary light exiting from the supplementary light-emitting region, and the first color light exiting from the first light-emitting region, and guide the excited light, the supplementary light and the first color light to the light collection device.

8. The light source device according to claim 7, wherein the guide device comprises an aperture and a reflective concave surface located at a periphery of the aperture, the first color light having the first polarization state and the first color light having the second polarization state exiting from the polarization light splitter are guided to the color wheel through the aperture, and the reflective concave surface is configured to receive and reflect the excited light, the supplementary light and the first color light to the light collection device.

9. The light source device according to claim 7, wherein the guide device comprises a regional coating film and a guide element, the regional coating film comprises a third region and a fourth region, the first color light having the first polarization state and the first color light having the second polarization state exiting from the polarization light splitter are transmitted to the color wheel through the third region, the fourth region is configured to receive and reflect the excited light emitted from the wavelength conversion region, the supplementary light exiting from the supplementary light-emitting region, and the first color light exiting from the first light-emitting region to the guide element, and the guide element is configured to guide the excited light, the supplementary light and the first color light to the light collection device.

10. The light source device according to claim 7, wherein the guide device comprises a dichroic film, a mirror and a guide element, the first color light having the first polarization state and the first color light having the second polarization state exiting from the polarization light splitter are transmitted to the color wheel through the dichroic film, the dichroic film is configured to receive and reflect the excited light emitted from the wavelength conversion region, the supplementary light exiting from the supplementary light-emitting region to the guide element, the mirror is configured to receive and reflect the first color light exiting from the first light-emitting region to the guide element, and the guide element is configured to guide the excited light, the supplementary light and the first color light to the light collection device.

11. The light source device according to claim 9, wherein the color wheel further comprises a filter region, the guide element is configured to reflect the excited light, the supplementary light and the first color light to the filter region, the filter region is configured to provide the filtered excited light, the filtered supplementary light and the filtered first color light to the light collection device.

12. The light source device according to claim 11, further comprising:
a collection lens assembly located between the guide device and the color wheel; and
a relay lens configured to provide the excited light, the supplementary light and the first color light to the guide element.

13. The light source device according to claim 2, wherein the first light source and the second light source are each a first color laser light source, the first light-emitting region comprises a scattering layer, the supplementary light comprises a second color laser light and a third color laser light, the supplementary light source comprises a second color laser light source and a third color laser light source, the excited light comprises a second color excited light and a third color excited light, the wavelength conversion region comprises a second color wavelength conversion region that emits the second color excited light and a third color wavelength conversion region that emits the third color excited light, the second color laser light source is turned on when the second color wavelength conversion region emits the second color excited light, and the third color laser light source is turned on when the third color wavelength conversion region emits the third color excited light.

14. The light source device according to claim 13, further comprising:
a dichroic film,
wherein the second color laser light source is configured to emit the second color laser light to the dichroic film, the third color laser light source is configured to emit the third color laser light to the dichroic film, and the dichroic film is configured to guide the second color laser light and the third color laser light to the supplementary light-emitting region.

15. The light source device according to claim 2, further comprising:
a first lens and a second lens,
wherein the first lens is located between the polarization light splitter and the second lens, the second lens is located between the first lens and the color wheel, the first lens is configured to converge the first color light exit from the polarization light splitter and then guide it to the second lens, and the second lens is configured to collimate the first color light exiting from the first lens and then provide it to the color wheel.

16. The light source device according to claim 5, wherein the light deflection structure comprises a first mirror having the first reflection surface and a second mirror having the second reflection surface that are arranged parallel to each other, the first mirror is configured to receive and reflect the first color light having the second polarization state to the second mirror, and the second mirror is configured to receive and reflect the first color light having the second polarization state to the polarization light splitter.

17. The light source device according to claim 10, wherein the color wheel further comprises a filter region, the guide element is configured to reflect the excited light, the supplementary light and the first color light to the filter region, the filter region is configured to provide the filtered excited light, the filtered supplementary light and the filtered first color light to the light collection device.

18. The light source device according to claim 17, further comprising:
 a collection lens assembly located between the guide device and the color wheel; and
 a relay lens configured to provide the excited light, the supplementary light and the first color light to the guide element.

19. A display apparatus, comprising a light source device and a spatial light modulator, the light source device is configured to emit light to the spatial light modulator, and the spatial light modulator is configured to modulate the light emitted by the light source device according to image data to generate an image light, wherein the light source device comprises: an excitation light source, a supplementary light source, and a color wheel, wherein:
 the excitation light source is configured to emit a first color light to the color wheel;
 the color wheel comprises a first light-emitting region, a wavelength conversion region, and a supplementary light-emitting region, the first light-emitting region and the wavelength conversion region are sequentially arranged along a circumferential direction, the first light-emitting region is configured to receive the first color light in a first time period and emit the first color light, and the wavelength conversion region is configured to receive the first color light in a second time period and emit an excited light; and
 the supplementary light-emitting region is located on an inner side or an outer side of the wavelength conversion region, and the supplementary light source is configured to emit, during the second time period, a supplementary light that broadens a color gamut and at least partially overlaps with a spectrum of the excited light, and the supplementary light exiting from the supplementary light-emitting region is combined with the excited light exiting from the wavelength conversion region.

20. The display apparatus according to claim 19, wherein the light source device further comprises a polarization light splitter, and a light deflector, wherein:
 the excitation light source comprises a first light source configured to emit the first color light having a first polarization state and a second light source configured to emit the first color light having a second polarization state, the polarization light splitter comprises a first region and a second region, the second region is configured to receive the first color light having the first polarization state emitted by the first light source, the light deflector is arranged between the second light source and the polarization light splitter and is configured to control the first color light having the second polarization state emitted by the second light source to be incident in the first region in the first time period and incident in the second region in the second time period;
 in the first time period, the first region is configured to emit the first color light having the second polarization state to the first light-emitting region, the second region is configured to emit the first color light having the first polarization state to the first light-emitting region, and the first light-emitting region is configured to combine the first color light having the first polarization state with the first color light having the second polarization state, and emit a combined light of the first color light having the first polarization state and the first color light having the second polarization state; and
 in the second time period, the second region is configured to emit the first color light having the first polarization state and the first color light having the second polarization state to the wavelength conversion region, the wavelength conversion region is configured to emit the excited light, and the supplementary light source is configured to emit the supplementary light to the supplementary light-emitting region.

* * * * *